US011971152B2

(12) United States Patent
Qiu et al.

(10) Patent No.: US 11,971,152 B2
(45) Date of Patent: Apr. 30, 2024

(54) LIGHTING MODULE FOR THREE-DIMENSIONAL SUSPENSION IMAGING, VEHICLE ACCESSORY DEVICE AND VEHICLE

(71) Applicant: HASCO VISION TECHNOLOGY CO., LTD., Shanghai (CN)

(72) Inventors: Zhiping Qiu, Shanghai (CN); He Zhu, Shanghai (CN); Wenhui Sang, Shanghai (CN)

(73) Assignee: HASCO VISION TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/920,302

(22) PCT Filed: Feb. 26, 2021

(86) PCT No.: PCT/CN2021/078206
§ 371 (c)(1),
(2) Date: Oct. 20, 2022

(87) PCT Pub. No.: WO2021/213007
PCT Pub. Date: Oct. 28, 2021

(65) Prior Publication Data
US 2023/0138596 A1 May 4, 2023

(30) Foreign Application Priority Data
Apr. 20, 2020 (CN) .......................... 202010312960.7

(51) Int. Cl.
*F21S 43/20* (2018.01)
*F21S 43/15* (2018.01)
(Continued)

(52) U.S. Cl.
CPC ............... *F21S 43/26* (2018.01); *F21S 43/15* (2018.01); *F21S 43/195* (2018.01); *G02B 30/56* (2020.01);
(Continued)

(58) Field of Classification Search
CPC .......... F21S 43/15; F21S 43/26; F21S 43/195; G02B 30/56
See application file for complete search history.

(56) References Cited

U.S. PATENT DOCUMENTS 4,194,809 A * 3/1980 Campagna, Jr. ..... B60Q 1/2657
116/28 R
5,712,731 A   1/1998 Drinkwater et al.
(Continued)

FOREIGN PATENT DOCUMENTS

CN   102927473 A   2/2013
CN   106338786 A   1/2017
(Continued)

OTHER PUBLICATIONS

Written Opinion of the International Search Authority, China National Intellectual Property Administration, Application No. PCT/CN2021/078206, dated May 20, 2021, 4 pages.
(Continued)

*Primary Examiner* — Christopher E Dunay
(74) *Attorney, Agent, or Firm* — Ziegler IP Law Group (57) ABSTRACT

A lighting module for three-dimensional suspension imaging, includes a micro lens array and a micro image-text element, wherein a transparent medium layer is arranged between the micro lens array and the micro image-text element; the micro image-text element includes a micro image-text array corresponding to the micro lens array; and the micro image-text element is arranged in such a way that light is irradiated from the micro image-text array to the
(Continued)

micro lens array through the transparent medium layer and forms a three-dimensional suspension image. The lighting module is used in a vehicle lamp, a vehicle accessory device and a vehicle, and can realize an image having a three-dimensional, suspension and dynamic effect, which image has a good visual effect.

8 Claims, 11 Drawing Sheets

(51) Int. Cl.
    *F21S 43/19*     (2018.01)
    *G02B 30/56*     (2020.01)
    *F21S 43/14*     (2018.01)
    *F21W 103/35*     (2018.01)
    *F21W 103/60*     (2018.01)
(52) U.S. Cl.
    CPC .......... *F21S 43/14* (2018.01); *F21W 2103/35* (2018.01); *F21W 2103/60* (2018.01)

(56) References Cited

U.S. PATENT DOCUMENTS 8,009,360 B2\*   8/2011   Steenblik ............... G02B 30/27
                                                      359/627

2004/0021853 A1\*   2/2004   Stam .................... G06V 10/143
                                                      356/218
2010/0316959 A1\*   12/2010   Gates ............... B29D 11/00365
                                                      359/619
2013/0215515 A1\*   8/2013   Kinoshita .............. G02B 30/56
                                                     359/619
2015/0198749 A1\*   7/2015   Ye ............................ G02B 5/18
                                                     359/581
2017/0328536 A1\*   11/2017   Chen ........................ F21V 3/10
2019/0064537 A1\*   2/2019   Min ...................... F21S 41/285
2019/0152251 A1\*   5/2019   Schilling ................ B42D 25/41
2022/0196221 A1\*   6/2022   Sabatini ................ F21S 41/663

FOREIGN PATENT DOCUMENTS

| | | |
|---|---|---|
| CN | 108800058 A | 11/2018 |
| CN | 212569308 U | 2/2021 |
| CN | 112462531 A | 3/2021 |
| JP | H1166907 A | 3/1999 |

OTHER PUBLICATIONS

International Search Report, China National Intellectual Property Administration, Application No. PCT/CN2021/078206, dated May 26, 2021, 4 pages, English Translation, 3 pages.

\* cited by examiner

FIG. 33 ns array and a micro image-text element, wherein a transparent medium layer is provided between the microlens array and the micro image-text element, the micro image-text element includes a micro image-text array corresponding to the microlens array, and the micro image-text element is arranged in such a way that light can be irradiated from the micro image-text array to the microlens array through the transparent medium layer and form a three-dimensional suspended image.

LIGHTING MODULE FOR THREE-DIMENSIONAL SUSPENSION IMAGING, VEHICLE ACCESSORY DEVICE AND VEHICLE

CROSS-REFERENCE TO RELATED APPLICATION

The present disclosure claims the benefit to the Chinese patent application 202010312960.7, filed on Apr. 20, 2020, the contents of which are incorporated herein by reference.

TECHNICAL FIELD

The present disclosure relates to vehicle imaging devices, specifically to a lighting module for three-dimensional suspension imaging. In addition, the present disclosure further relates to a vehicle lamp, a vehicle accessory device, and a vehicle.

BACKGROUND ART

With the development of social economy, the automobile industry is also developed accordingly, and the car ownership is also increasing. The vehicle lamp in an automobile is a quite important component. With the continuous development of automobile lighting technology, the vehicle lamp that simply can meet the requirements of automobile lighting function gradually cannot meet the requirements. At present, more requirements are imposed on the development of the vehicle lamp.

The existing vehicle lamp forms a light pattern mainly by means of a lighting module. The light pattern is mostly a planar pattern, which cannot present stereoscopic text-image information, cannot bring a better visual effect to the customers, and cannot satisfy the customers' requirement for imaging characteristics of the vehicle lamp.

Therefore, a novel lighting module for three-dimensional suspension imaging needs to be designed to overcome or alleviate the above technical problems.

SUMMARY

The technical problem to be solved by the present disclosure is to provide a lighting module for three-dimensional suspension imaging, wherein the lighting module for three-dimensional suspension imaging can realize an image having a three-dimensional, suspended, and dynamic effect, has a relatively good visual effect, and meets the customers' requirements.

The technical problem to be further solved by the present disclosure is to provide a vehicle lamp, which vehicle lamp can realize a light pattern image with a three-dimensional, suspended, and dynamic effect.

The technical problem to be further solved by the present disclosure is to provide a vehicle lamp, which vehicle lamp can realize a light pattern image with a three-dimensional, suspended, and dynamic effect.

The technical problem to be further solved by the present disclosure is to provide a vehicle accessory device, which vehicle accessory device can realize a visual effect with a three-dimensional, suspended, and dynamic effect.

Besides, the technical problem to be solved by the present disclosure is to provide a vehicle, which vehicle can make a character or pattern observed present a three-dimensional, suspended, and dynamic effect.

In order to solve the above technical problem, in a first aspect, the present disclosure provides a lighting module for three-dimensional suspension imaging, including a microlens array and a micro image-text element, wherein a transparent medium layer is provided between the microlens array and the micro image-text element, the micro image-text element includes a micro image-text array corresponding to the microlens array, and the micro image-text element is arranged in such a way that light can be irradiated from the micro image-text array to the microlens array through the transparent medium layer and form a three-dimensional suspended image.

Preferably, the micro image-texts on the micro image-text array are light sources, and the light sources are arranged to form a separately addressable light source matrix.

More preferably, the micro image-text element further includes a mobile actuator, and a micro light source array is mounted on the mobile actuator, so that the micro light source array can be allowed to move with the mobile actuator to form the micro image-text array.

Specifically, the micro image-text array includes a micro image-text layer, and a plurality of hollowed-out micro image-texts are arranged on the micro image-text layer.

Typically, the micro image-text array is formed by embossing.

Typically, the micro image-text array, the transparent medium layer, and the microlens array are stacked in sequence to form an image thin film.

Specifically, the microlens array has a thickness not less than 10 micrometers, and the transparent medium layer has a thickness not less than 15 micrometers.

Typically, the microlenses of the microlens array and the micro image-texts of the micro image-text array are regularly arranged horizontally and longitudinally, obliquely arranged, regularly arranged in a crossing manner, or randomly arranged.

In a second aspect, the present disclosure provides a vehicle lamp, including the lighting module for three-dimensional suspension imaging according to the above technical solution, wherein the image thin film is provided on an inner surface, an outer surface, or an interior of a decorative ring or a decorative strip, or provided on an inner surface, an outer surface, or an interior of the light distribution lens, or provided on a transparent bearing member in the vehicle lamp, and the microlens array is provided toward the light distribution lens.

In a third aspect, the present disclosure provides a vehicle lamp, including the lighting module for three-dimensional suspension imaging according to any one of the above technical solutions.

In a fourth aspect, the present disclosure provides a vehicle accessory device, including the lighting module for three-dimensional suspension imaging according to the above technical solution.

In a fifth aspect, the present disclosure provides a vehicle, including the vehicle lamp according to the above technical solution, or the vehicle accessory device according to the above technical solution.

Through the above technical solutions, the beneficial effects of the present disclosure are as follows:

in the basic technical solution of the present disclosure, through the Moire amplification effect of the microlens array to the micro image-text array, an image formed by the light passing through the micro image-text array is amplified by the microlens array to form a light pattern image with a certain depth of field or a dynamic effect of floating or sinking.

In the above, the lighting module for three-dimensional imaging of the present disclosure can be applied to multiple accessory devices on the vehicle body of the vehicle, such as interior and exterior decorative lamps, a trip computer display screen, a touch control switch or an accessory, with a sense of fashion and a sense of science and technology.

Other advantages of the present disclosure and the technical effects of preferred embodiments will be further described in the following embodiments.

| Illustration of reference signs | |
| --- | --- |
| 1 microlens array | 11 microlens |
| 2 transparent medium layer | 3 micro image-text array |
| 31 micro image-text | 32 micro image-text layer |
| 41 mobile actuator | 42 micro light source array |
| 5 image thin film | 6 light distribution lens |
| 7 vehicle lamp housing | 100 vehicle tail lamp |
| 101 projected image-text | 201 driver's eyes |
| 202 driver's sight | 10 matrix LED light-emitting element |
| 20 first lens | 301 matrix LED light source |
| 302 secondary lens group | 303 Micro LED light-emitting module |
| 401 first light pattern region | 402 second light pattern region |
| 403 third light pattern region | 404 fourth light pattern region |

DETAILED DESCRIPTION OF EMBODIMENTS

The embodiments of the present disclosure are described in detail below with reference to accompanying drawings. It should be understood that the embodiments described herein are merely used to illustrate and explain the present disclosure, rather than being intended to limit the present disclosure.

In the description of the present disclosure, it should be noted that unless otherwise specified and defined explicitly, terms "mount", "provide", and "connect" should be construed in a broad sense. For example, it may be a fixed connection, a detachable connection, or an integrated connection; it may be a direct connection, an indirect connection through an intermediary, or inner communication between two elements or interaction between two elements. For a person ordinarily skilled in the art, specific meanings of the above terms in the present disclosure could be understood according to specific circumstances.

Figure 15:
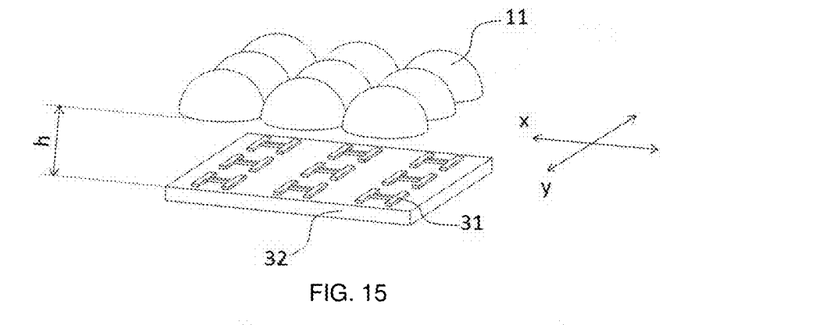
FIG. 15 is a first schematic diagram of the lighting module for three-dimensional suspension imaging in an embodiment of the present disclosure.

It should be understood that, in order to facilitate describing the present disclosure and simplify the description, the terms "up (upper)" and "down (lower)" are based on an image thin film 5 itself, for example, as shown in FIG. 15, microlenses 11 and micro image-texts 31 are arranged in an up-down direction; the terms are based on orientation or positional relationships shown in the accompanying drawings, rather than indicating or implying that related devices or elements have to be in the specific orientation or configured and operated in a specific orientation, therefore, they should not be construed as limitation to the present disclosure; moreover, orientation terms in the present disclosure should be understood with reference to actual installation state.

As shown in FIG. 1 to FIG. 14, a lighting module for three-dimensional suspension imaging in a basic embodiment of the present disclosure includes a microlens array 1 and a micro image-text element, a transparent medium layer 2 is provided between the microlens array 1 and the micro image-text element, the micro image-text element includes a micro image-text array 3 corresponding to the microlens array 1, and the micro image-text element is arranged in such a way that light can be irradiated from the micro image-text array 3 to the microlens array 1 through the transparent medium layer 2 and form a three-dimensional suspended image.

The above basic technical solution of the lighting module for three-dimensional suspension imaging can be adapted to general vehicle lamps. The combination of the micro image-text array 3 and the microlens array 1 can achieve the Moire amplification effect. Under the irradiation of a light source, light forms a light pattern image with a three-dimensional, suspended, and dynamic effect through the micro image-text array 3 and the microlens array 1, which can bring a novel macroscopic visual effect to the user; generally, the micro image-text array 3 is located near a focal plane of the microlens array 1, and can render a better light pattern effect, transmit driving information, and have a certain aesthetic feeling.

Figure 6:
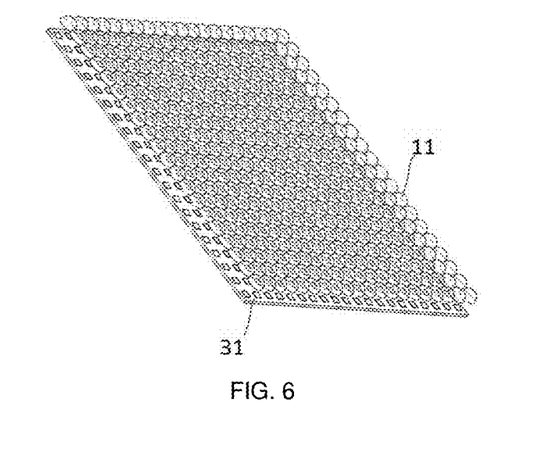
FIG. 6 is a structural schematic view of a lighting module for three-dimensional suspension imaging in a second embodiment of the present disclosure.
Figure 7:
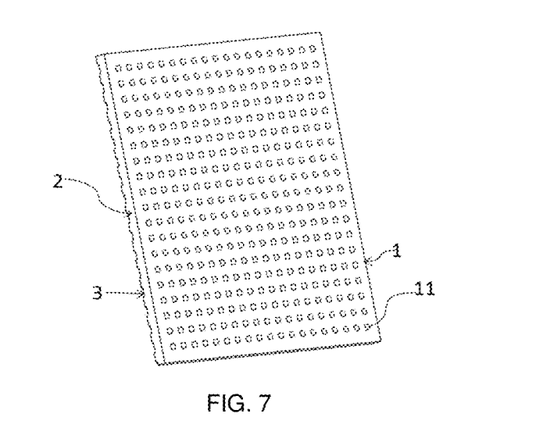
FIG. 7 is a structural schematic view of the lighting module for three-dimensional suspension imaging in a third embodiment of the present disclosure.

There are a variety of specific structures capable of achieving the technical effect of the micro image-text array 3. For example, as shown in FIG. 6, a separately addressable light source matrix is used as the micro image-text array 3, i.e., a light source is used as a micro image-text 31 on the micro image-text array 3, and different dynamic visual effects are generated by controlling on and off of each light source.

Alternatively, as shown in FIG. 7 to FIG. 12, a micro image-text layer 32 also may be formed, and several hollowed-out patterns are arranged on the micro image-text layer 32, other parts of the micro image-text layer 32 are opaque, and the hollowed-out patterns are taken as micro image-texts 31 to form the micro image-text array 3. Under the irradiation of a light source, light passes through the hollowed-out patterns and is emitted under the effect of the microlens array 1 to form a three-dimensional dynamic image, to attract other drivers' attention, and provide corresponding driving information. Different dynamic visual effects are generated by controlling on and off of each light source.

Figure 9:
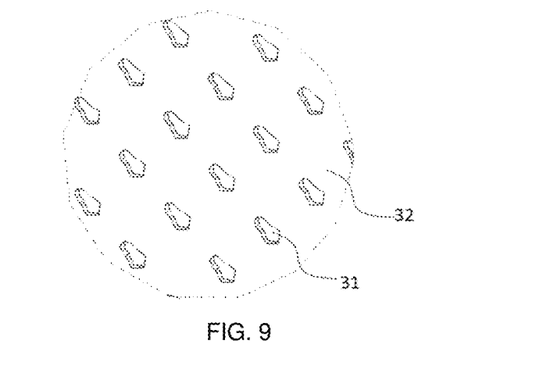
FIG. 9 is a partially enlarged view of a part B in FIG. 8.
Figure 10:
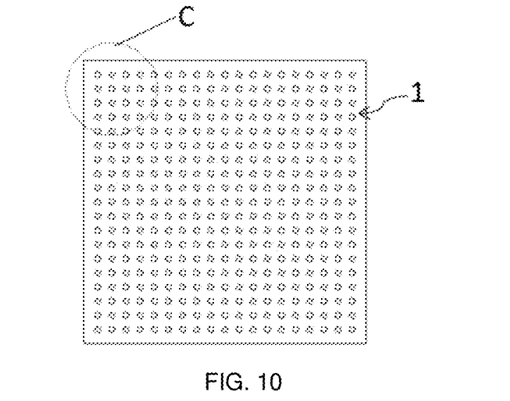
FIG. 10 is a structural schematic view of the micro image-text layer in a fourth embodiment of the present disclosure.
Figure 11:
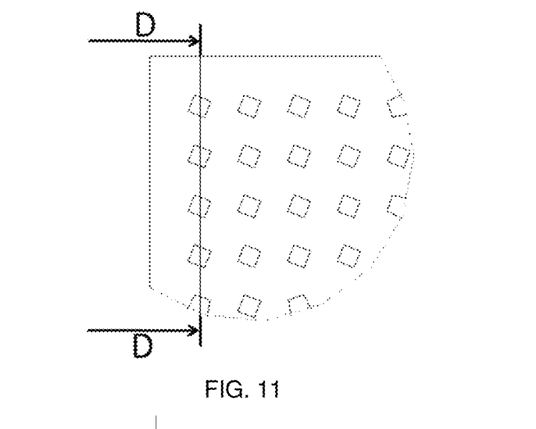
FIG. 11 is a partially enlarged view of a part C in FIG. 10.

In the above, the light source may be an LED light source, an OLED light source, a laser light source, or the like. FIG. 9 shows an example of hollowed-out pattern. Without doubt, hollowed-out patterns of other shapes also may be used.

Figure 13:
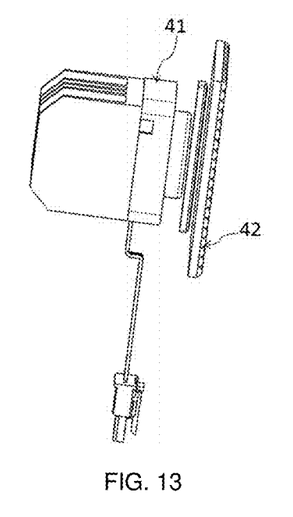
FIG. 13 is a first perspective structural schematic view of the lighting module for three-dimensional suspension imaging in a fifth embodiment of the present disclosure.
Figure 14:
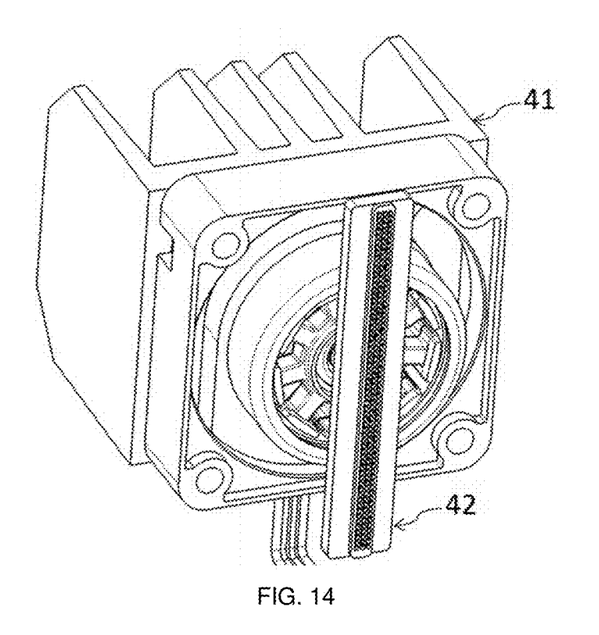
FIG. 14 is a second perspective structural schematic view of the lighting module for three-dimensional suspension imaging in the fifth embodiment of the present disclosure.

As another example, as shown in FIG. 13 and FIG. 14, a micro light source array 42 is provided, and the micro light source array 42 is mounted on a mobile actuator 41. Under the action of the mobile actuator 41, the micro light source array 42 moves linearly or rotates to form the micro image-text array 3.

In the above, the mobile actuator 41 may be an existing drive device, such as a rotary motor and a linear motor; and the micro light source may be an LED light source, an OLED light source, a laser light source or the like.

Figure 5:
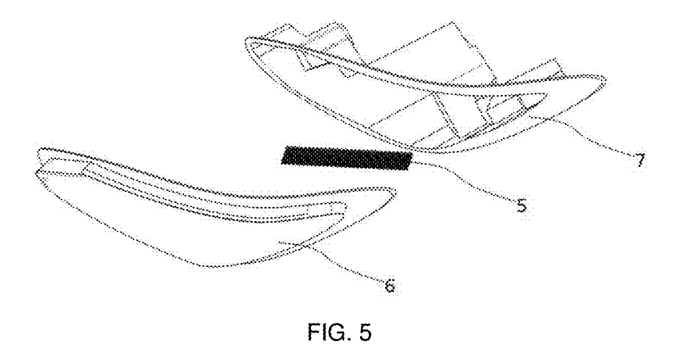
FIG. 5 is an axonometric assembly schematic view of a vehicle lamp in an embodiment of the present disclosure, wherein the vehicle lamp is mounted with the image thin film.

Various specific structures of the above lighting module for three-dimensional suspension imaging of the present disclosure can be directly applied to general vehicle lamps. As shown in FIG. 5, the lighting module is provided in a cavity formed between a light distribution lens 6 and a vehicle lamp housing 7. After passing through the lighting module for three-dimensional suspension imaging, light is emitted from the light distribution lens 6, so that a light pattern formed has three-dimensional, suspended, and dynamic visual effect.

Generally, the microlenses 11 of the microlens array 1 are configured to gather light, and may be hemispherical, ellipsoidal, pyramid or in other structural forms that can achieve equivalent technical effects. The microlenses 11 are mounted on the transparent medium layer 2 to form the microlens array 1; the transparent medium layer 2 may be made of PC (polycarbonate), PVC (polyvinyl chloride), PET (polyethylene terephthalate), PMMA (polymethyl methacrylate) or BOPP (biaxially oriented polypropylene film), etc., preferably PET.

Figure 8:
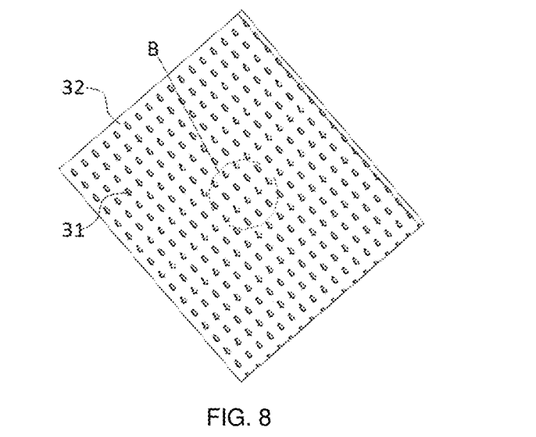
FIG. 8 is a structural schematic view of a micro image-text layer in the third embodiment of the present disclosure.
Figure 12:
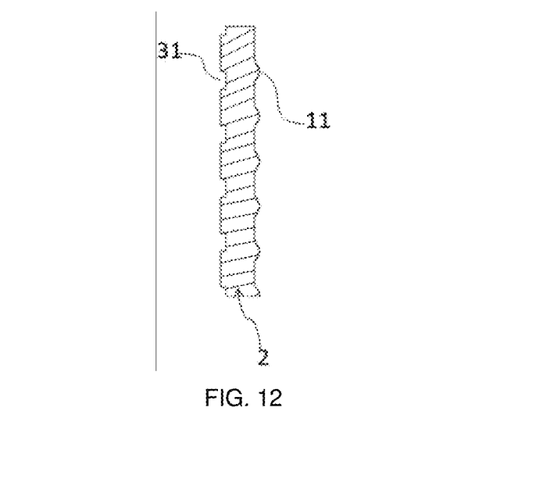
FIG. 12 is a sectional view along a line D-D in FIG. 11.

Typically, the lighting module for three-dimensional suspension imaging of the present disclosure can be made into a thin film structure, for example, an image thin film 5, as shown in FIG. 1 to FIG. 4, and the micro image-text array 3 is formed by an embossing process; specifically, a layer of ultraviolet curing glue is coated on the transparent medium layer 2, and grooves with a depth greater than 1 micron are embossed on the surface of the ultraviolet curing glue by using a relief block with micro image-texts, and meanwhile cured, and then parts other than the grooves are made opaque, for example, nano ink is coated on the surface of the transparent medium layer 2 by blade coating. As the grooves are generally less than 2 microns in dimension, and nano ink particles are generally tens of microns or more, the nano ink particles will not be filled into the grooves, and will not affect passage of light through the positions of the grooves, thus forming the micro image-text array 3. By the same reasoning, reference also can be made to FIG. 12, grooves with a larger dimension are provided on the transparent medium layer 2, other parts are opaque, and a surface where the grooves are located is symmetrical to a surface where the microlenses 11 are located. Alternatively, as shown in FIG. 8 and FIG. 9, the micro image-text layer 32 having several hollowed-out images is formed. With reference to FIG. 12, by attaching the micro image-text layer 32 on the transparent medium layer 2, the micro image-text array 3 can be formed.

In the above, the microlens array 1 is a three-dimensional refractive lens array made of a PVB (polyvinyl butyral) molding material with a thickness of 10 micrometers or more, wherein the "three-dimensional refractive lens array" refers to a three-dimensional lens array of a transparent material, and light can be refracted by a lens body. The thickness of the transparent medium layer 2 is not less than 15 microns. The thickness of the transparent medium layer 2 also may be of the order of millimeters. The thickness of the transparent medium layer is affected by the focal length of the microlens 11, and is generally approximately equal to the focal length of the microlens 11. The thickness will affect the sense of distance of the three-dimensional suspension effect. The greater the thickness is, the greater the three-dimensional sense of distance is.

Figure 21:
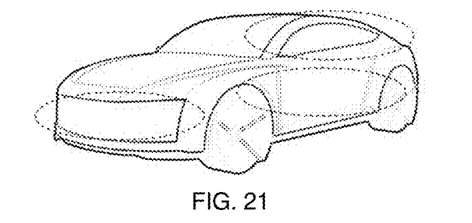
FIG. 21 is a fifth effect schematic view of the lighting module for three-dimensional suspension imaging in an embodiment of the present disclosure.
Figure 22:
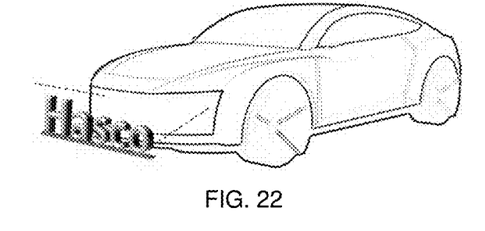
FIG. 22 is a sixth effect schematic view of the lighting module for three-dimensional suspension imaging in an embodiment of the present disclosure.
Figure 23:
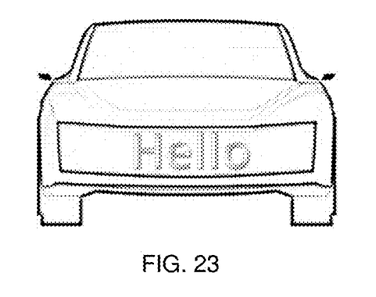
FIG. 23 is a seventh effect schematic view of the lighting module for three-dimensional suspension imaging in an embodiment of the present disclosure.

Such thin film structural characteristics of the lighting module for three-dimensional suspension imaging enables the lighting module for three-dimensional suspension imaging to have a wider application range on the vehicles, for example, as shown in FIG. 22 and FIG. 23, the lighting module can be provided outside the vehicle, such as on a headlamp or other vehicle lamps, or as shown in FIG. 21, the lighting module also can be provided on a vehicle accessory device, such as a trip computer display screen, a touch control switch or an accessory. In the above, when the image thin film 5 is provided on the vehicle lamp, the image thin film 5 can be provided on an inner surface, an outer surface, or an interior of a decorative ring or a decorative strip, or provided on an inner surface, an outer surface, or an interior of the light distribution lens 6, or a bearing member is provided in the vehicle lamp for attaching the image thin film 5, so that the microlens array 1 is provided toward the light distribution lens 6. In the above, the term "interior" means that the image thin film 5 can be provided as an interlayer inside the decorative ring or the decorative strip, which can achieve corresponding technical effect.

Figure 1:
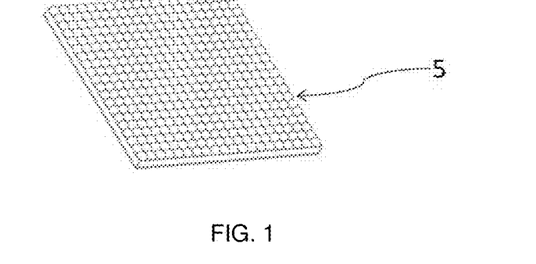
FIG. 1 is a first structural schematic view of an image thin film in a first embodiment of the present disclosure.
Figure 2:
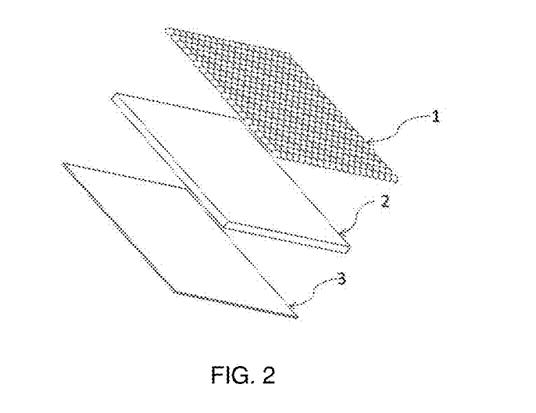
FIG. 2 is an axonometric assembly schematic view of the image thin film in the first embodiment of the present disclosure.
Figure 3:
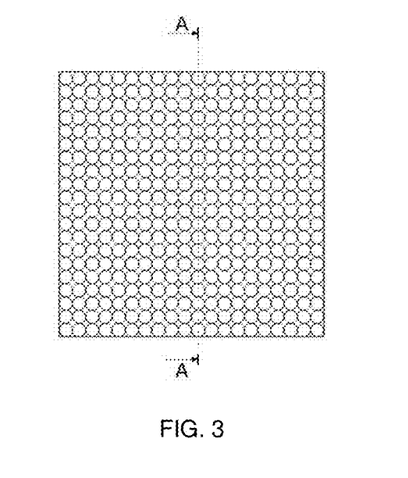
FIG. 3 is a second structural schematic view of the image thin film in the first embodiment of the present disclosure.
Figure 4:
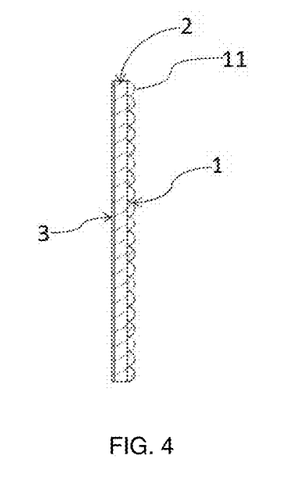
FIG. 4 is a sectional view along a line A-A in FIG. 3.

FIG. 3 and FIG. 4 show an arrangement mode of the microlenses 11 and the micro image-texts 31, wherein the microlenses 11 and the micro image-texts 31 are regularly arranged horizontally and longitudinally, and certainly, also may be arranged obliquely, regularly arranged in a crossing manner, randomly arranged, or the like.

Taking a tail lamp as an example, as shown in FIG. 17 to FIG. 20, the lighting module for three-dimensional suspension imaging of the present disclosure is provided on a vehicle tail lamp 100. During driving, when a vehicle ahead needs to send information to a vehicle behind, a three-dimensional image can be directly formed in the air; if the vehicle ahead needs an emergency stop, the tail lamp sends a projected image 101, "STOP", to remind the vehicle behind. As the image-text information displayed by the Moire imaging is isotropic, it can be observed from various angles, will not be ignored, and can fall into the driver's sight 202 and be observed by the driver's eyes 201 of the vehicle behind, thus effectively ensuring the driving safety.

Figure 24:
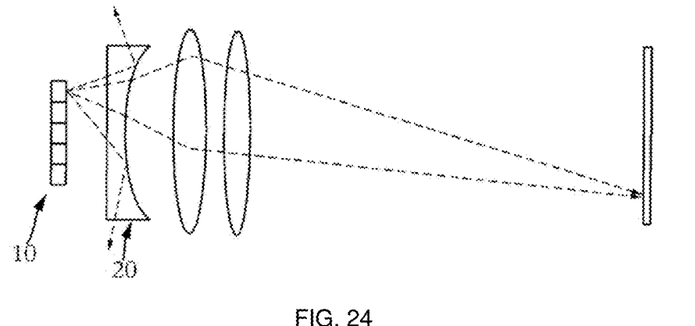
FIG. 24 is a structural schematic view of a lighting module of a vehicle headlamp in the prior art.
Figure 25:
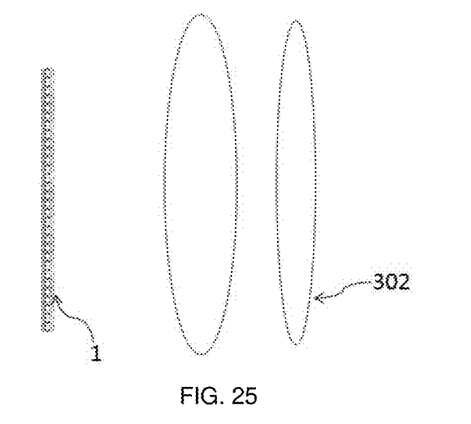
FIG. 25 is a first structural schematic view of the lighting module of the headlamp in an embodiment of the present disclosure.
Figure 26:
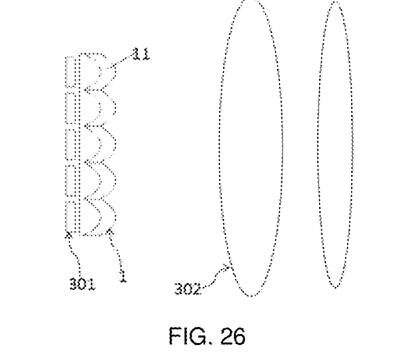
FIG. 26 is a second structural schematic view of the lighting module of the headlamp in an embodiment of the present disclosure, wherein a manner of combining a matrix LED light source and a microlens array is adopted.
Figure 27:
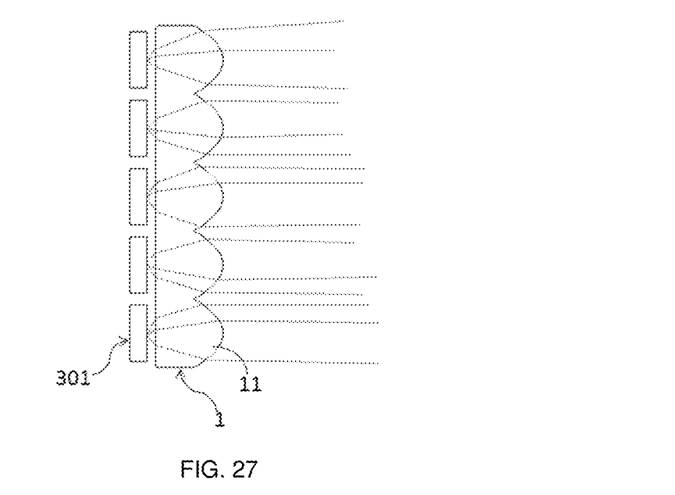
FIG. 27 is a schematic view of a light path of the manner of combining the matrix LED light source and the microlens array in FIG. 26.

The headlamp plays a very important role in vehicle lighting. As shown in FIG. 24. German patent application DE 1 0201 71 05888 A1 provides a projection lighting module for a vehicle headlamp using a matrix LED light-emitting element 10, which requires a lens group projection system consisting of several lenses, particularly a first lens 20 in FIG. 24. The first lens 20 mainly functions to concentrate light beams and improve light efficiency, i.e., as a first-stage lens provided next to the matrix LED light-emitting element 10, concentrating more light emitted from the matrix LED light-emitting element 10 into a lens of next-stage, thus improving the utilization efficiency of the light. However, this technical solution has the following deficiencies: (1) there are a larger number of lenses in the lens group, and when assembling a product, it is difficult to ensure relative positions of various lenses and between the lenses and the matrix LED light-emitting element 10; and (2) the lens group with a larger number of lenses also makes the optical system have a larger dimension, which is not compact enough.

Based on the principle of the lighting module for three-dimensional suspension imaging of the present disclosure, the overall dimension of the headlamp lighting module can be reduced.

For example, as shown in FIG. 25 to FIG. 28, the headlamp lighting module may include a matrix LED light source 301 and a primary optical element, the primary optical element is provided as the microlens array 1, the microlens array 1 is provided next to the matrix LED light source 301, so that relative positions between the two can be easily ensured, moreover, the microlens array 1 with a small dimension replaces the first lens 20 in the technical solution of the above German patent DE 102017105888 A1, and also can gather light to improve the light efficiency, that is, the microlens array 1 gathers more light emitted by the matrix LED light source 301 into a secondary lens group 302, thus improving the utilization efficiency of light, reducing the number of lenses, meanwhile simplifying the structure of the headlamp lighting module of the vehicle, and facilitating the arrangement inside the vehicle lamp.

Figure 28:
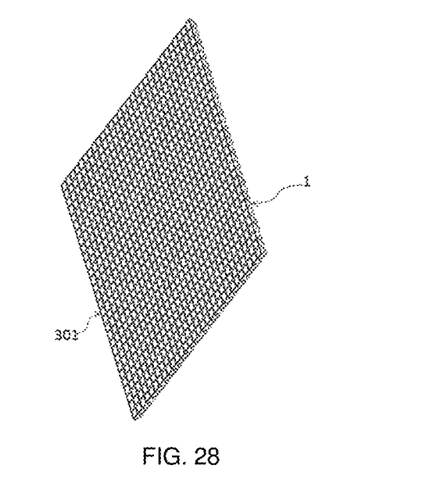
FIG. 28 is a perspective structural schematic view of the manner of combining the matrix LED light source and the microlens array in FIG. 26.
Figure 29:
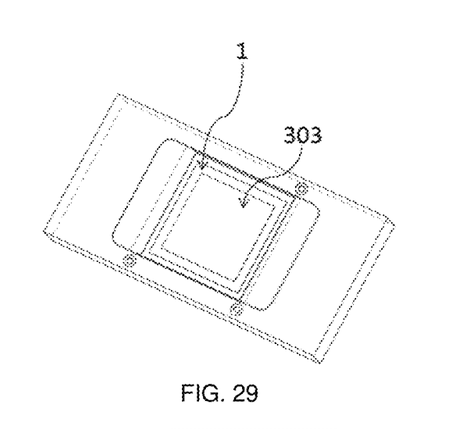
FIG. 29 is a third structural schematic view of the lighting module of the headlamp in an embodiment of the present disclosure, wherein a Micro LED light-emitting module is attached to the microlens array.

In the above, as shown in FIG. 28, a light-emitting surface of the LED unit of the matrix LED light source 301 is preferably square, with a width dimension of less than or equal to 200 microns, the corresponding microlens 11 has a width dimension of less than or equal to 300 microns, and preferably, the width dimension of the light-emitting surface of the LED unit is less than the width dimension of the microlens 11, in this way, the microlenses 11 can cover the light-emitting surface of the corresponding LED units in a light propagation direction, so that as much light as possible enters into the microlenses 11. Further preferably, the microlens array 1 and the light-emitting surface array of the LED unit of the matrix LED light source 301 are attached.

Also, as shown in FIG. 29 to FIG. 32, the above matrix LED light source 301 may be replaced by a Micro LED light-emitting module 303. The Micro LED light-emitting module 303 refers to several small light-emitting surface matrices arranged horizontally and longitudinally obtained by dividing a whole LED light-emitting surface. Each small light-emitting surface can be individually addressed to control a lighting state. The advantage of the Micro LED light-emitting module 303 lies in having the characteristics of inorganic LED, such as high efficiency, high brightness, high reliability, and fast response time, also has the characteristics of self-illumination, small volume, being light and thin, and also can easily achieve the effect of energy saving.

Figure 30:
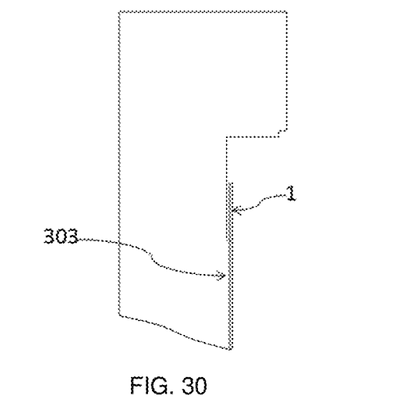
FIG. 30 is a partially enlarged sectional diagram of FIG. 29.
Figure 31:
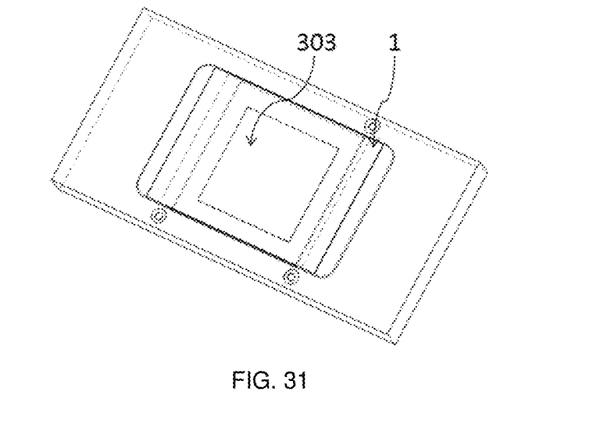
FIG. 31 is a fourth structural schematic view of the lighting module of the headlamp in an embodiment of the present disclosure, wherein the Micro LED light-emitting module and the microlens array has a gap therebetween.
Figure 32:
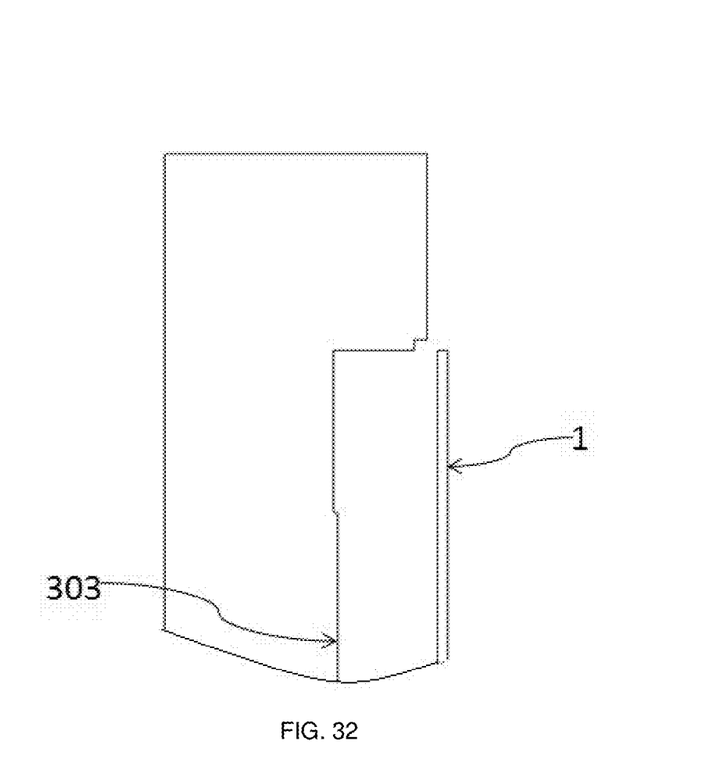
FIG. 32 is a partially enlarged sectional diagram of FIG. 31.

In the above, as shown in FIG. 30, the microlens array 1 can be made into a thin film, so that the microlens array 1 is attached to a light-emitting surface of the Micro LED light-emitting module 303, for example, the microlens array 1 is fixed on the Micro LED light-emitting module 303 by UV glue (photosensitive glue), or is fixed on the Micro LED light-emitting module 303 by means of embossing. Without doubt, as shown in FIG. 32, it is also possible that there is certain gap between the microlens array 1 and the light-emitting surface of the Micro LED light-emitting module 303. The number of lenses can also be simplified, so that the structure of the headlamp lighting module of the vehicle is more compact, facilitating the arrangement inside the headlamp.

Figure 33:
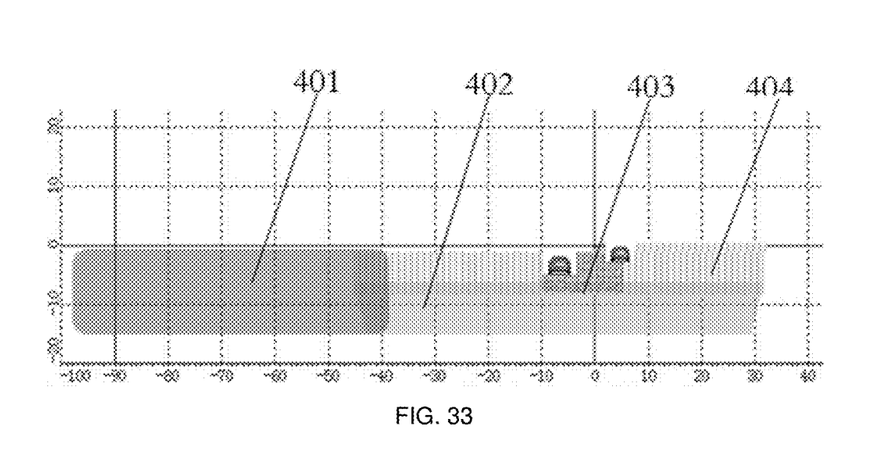
FIG. 33 is a schematic view of a light pattern effect of the lighting module of the headlamp in an embodiment of the present disclosure.

It can be seen intuitively from FIG. 33 that, as the matrix LED light source 301 or the LED units on the Micro LED light-emitting module 303 can be controlled to be turned off or turned on separately, the light pattern formed by the above lighting module of the headlamp is divided into matrix regions, so as to form light pattern regions in different shapes, such as a first light pattern region 401, a second light pattern region 402, a third light pattern region 403, and a fourth light pattern region 404 marked on FIG. 33. In particular, for example, for the light pattern displayed in the third light pattern region 403, when the light source corresponding to the region where the vehicle appearing in front is located is turned off, the corresponding light pattern region forms a dark region, which can prevent dazzling from being caused to the vehicle ahead. Certainly, certain characters also may be formed by combining on and off of various LED units, so as to transmit driving information more accurately.

The display principle is described below for better understanding the embodiments of the lighting module for three-dimensional suspension imaging of the present disclosure.

The microlenses 11 are arranged according to a certain cycle to form the microlens array 1, and the micro image-texts 31 are arranged according to a certain cycle to form the micro image-text array 3.

As shown in FIG. 15, a plane x-y coordinate system is established, the micro image-text array 3 is located on a lower surface of the transparent medium layer 2 (the transparent medium layer 2 is not shown), the microlens array 1 is located on an upper surface of the transparent medium layer 2, and the cycles of the microlenses 11 in x and y directions are a1 and a2, respectively, the cycles of the micro image-texts 31 in the x and y directions are b1 and b2, respectively, and the thickness of the transparent medium layer 2 is h, equal to the focal length of the microlens 11, that is, the micro image-texts 31 are located near a focal point of the microlens 11.

The imaging of the microlens array 1 is forming Moire amplification pattern between the two array structures, i.e., the microlens array 1 and the micro image-text array 3. According to Moire amplification formula, amplification powers wx and wy of the micro image-text 31 in the x and y directions are obtained as wx=a1/(b1−a1) and wy=a2/(b2−a2). If wx is positive, it indicates that orientation of a direction of the Moire amplification image in this direction is the same as the micro image-text 31, and if wx and wy are negative, it indicates that the orientation of the direction of the Moire amplification image in this direction is opposite to the micro image-text 31.

When the microlens array 1 and the micro image-text array 3 have a certain included angle θ therebetween, assuming that the cycles of the two array structures in this case are a and b, respectively, the cycle of the Moire amplification image is:

$$L = \frac{ab}{\sqrt{(a^2 + b^2 - 2ab\cos\theta)}},$$

and if a=b, the magnification power of the pattern is w=½ sin(θ/2).

If it is defined that counterclockwise rotation of the microlens array 1 relative to the micro image-text array 3 is positive, positive and negative magnification powers indicate rotation direction of the Moire amplification image with respect to the micro image-texts 31. If θ is negative, the magnification power w is also negative, and the Moire amplification image rotates counterclockwise by 90°+θ/2 compared with the micro image-texts 31, which is counterclockwise rotation. If θ is positive, the Moire amplification image rotates counterclockwise by −90°+θ/2 compared with the micro image-texts, which is clockwise rotation.

When the microlens array 1 and the micro image-text array 3 have a certain distance therebetween, the micro image-text array 3 will be caused to move due to change of observation angle. Assume that the cycle of the microlens array 1 is a, the cycle of the micro image-text array 3 is b, the distance between the microlens 11 and the micro image-text 31 is h, and the cycle of the Moire amplification image is L.

Figure 16:
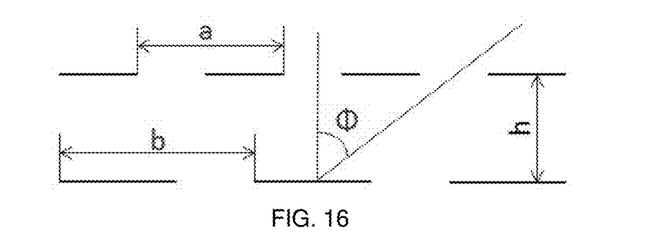
FIG. 16 is a second schematic diagram of the lighting module for three-dimensional suspension imaging in an embodiment of the present disclosure.
Figure 17:
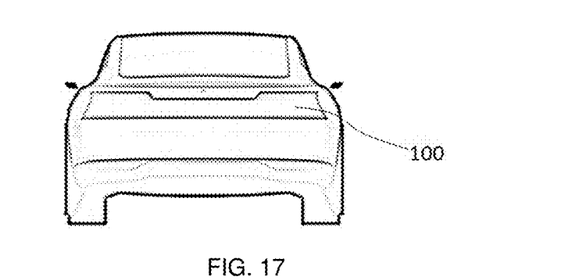
FIG. 17 is a first effect schematic view of the lighting module for three-dimensional suspension imaging in an embodiment of the present disclosure.
Figure 18:
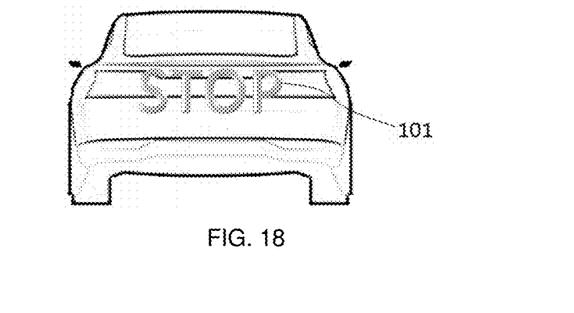
FIG. 18 is a second effect schematic view of the lighting module for three-dimensional suspension imaging in an embodiment of the present disclosure.
Figure 19:
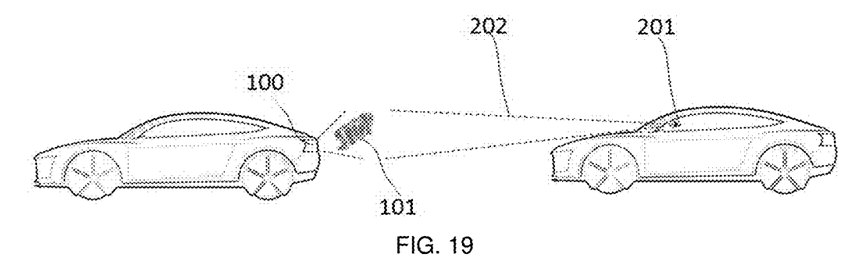
FIG. 19 is a third effect schematic view of the lighting module for three-dimensional suspension imaging in an embodiment of the present disclosure.
Figure 20:
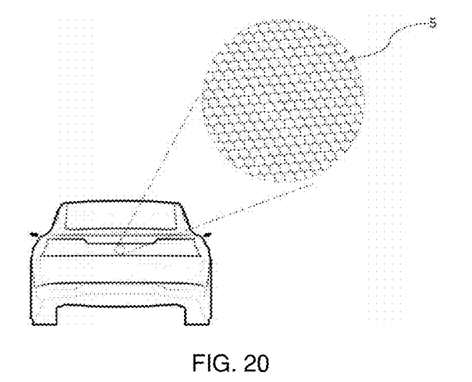
FIG. 20 is a fourth effect schematic view of the lighting module for three-dimensional suspension imaging in an embodiment of the present disclosure, wherein the image thin film is provided on a vehicle tail lamp.

As shown in FIG. 16, when φ deviated from the vertical direction is taken as the observation angle, a cycle by which the Moire amplification image moves can be expressed as $k_\phi = (h \tan \phi)/b$.

When the observation is deviated by angle φ, components of the cycle a of the microlens 11 and the cycle b of the micro text-image 31 in a direction perpendicular to the observation direction are a'=a cos φ and b'=b cos φ;

when the observation is deviated by angle φ, a cycle of the Moire amplification image displayed in a direction perpendicular to the observation direction is $L_\phi = L \cos \phi$.

Hence, when the observation angle is deviated from 0° to φ, a moving length $L_L$ of the Moire amplification image is $$L_L = \int_0^\phi L_\phi dk_\phi = L(h/2b)\ln[(1+\sin\phi)/(1-\sin\phi)]$$

$L_L$ can be used to describe dynamic effect of the Moire amplification image. It can be seen that the larger the cycle L of the Moire amplification image is, the larger the distance h between the microlens array 1 and the micro image-text array 3 is, and the smaller the cycle of the micro image-text array 3 is, then the better the dynamic effect is.

If the micro image-text array 3 and the microlens array 1 have the same arrangement direction and different arrangement cycles, the observer, moving eyes left and right or up and down, will see that a moving direction of the Moire amplification image is the same as or opposite to the direction in which the observer moves. When the magnification power w is positive, the directions are opposite; and when the magnification power w is negative, the directions are the same.

If the cycles of the micro image-text array 3 and the microlens array 1 are the same, but they have a small included angle θ therebetween, the Moire amplification image is arranged perpendicular to the micro image-text array 3. When the eyes move longitudinally, the Moire amplification image moves horizontally. When θ is positive, the eyes move upward, then the Moire amplification image moves rightward; and when θ is negative, the eyes move upward, the Moire amplification image moves leftward.

The above stereoscopic effect is formed by binocular parallax during observation. When the left and right eyes observe simultaneously, due to different observation angles, images seen by the two eyes are different and have certain parallax. The images observed by the left and right eyes are merged in the brain to form stereoscopic vision. When the cycle of the micro image-texts 31 is less than that of the microlenses 11, the feeling of image-text sinking is generated; on the contrary, when the cycle of the micro image-texts 31 is greater than that of the microlenses 11, the feeling of image-text floating is generated.

The preferred embodiments of the present disclosure are described in detail in the above with reference to the accompanying drawings, but the present disclosure is not limited thereto. Within the scope of technical concept of the present disclosure, many simple modifications can be made to the technical solutions of the present disclosure, including combination of various specific technical features in any suitable manners. In order to avoid unnecessary repetition, various possible combination manners are not described separately in the present disclosure. However, such simple modifications and combinations should also be considered as contents disclosed in the present disclosure, and all belong to the scope of protection of the present disclosure.

What is claimed is:

1. A lighting module for three-dimensional suspension imaging, comprising a microlens array and a micro image-text element, wherein a transparent medium layer is provided between the microlens array and the micro image-text element, the micro image-text element comprises a micro image-text array corresponding to the microlens array, and the micro image-text element is arranged in such a way that light can be irradiated from the micro image-text array to the microlens array through the transparent medium layer and form a three-dimensional suspended image, and wherein the micro image-text array comprises a micro image-text layer and a plurality of hollowed-out micro image-texts are arranged on the micro image-text layer;

wherein the micro image-text array, the transparent medium layer, and the microlens array are stacked in sequence to form an image thin film;

wherein, a layer of ultraviolet curing glue is coated on the transparent medium layer, and grooves with a depth greater than 1 micron are embossed on a surface of the ultraviolet curing glue by using a relief block with micro image-texts, and meanwhile cured, and then parts other than the grooves are made opaque.

2. The lighting module for three-dimensional suspension imaging according to claim 1, wherein micro image-texts on the micro image-text array are light sources, and the light sources are arranged to form a separately addressable light source matrix.

3. The lighting module for three-dimensional suspension imaging according to claim 2, wherein the microlens array has a thickness not less than 10 micrometers, and the transparent medium layer has a thickness not less than 15 micrometers.

4. The lighting module for three-dimensional suspension imaging according to claim 1, wherein the micro image-text element further comprises a mobile actuator, a micro light source array is mounted on the mobile actuator, so that the micro light source array can move with the mobile actuator to form the micro image-text array.

5. The lighting module for three-dimensional suspension imaging according to claim 1, wherein the micro image-text array is formed by embossing.

6. The lighting module for three-dimensional suspension imaging according to claim 1, wherein the microlens array has a thickness not less than 10 micrometers, and the transparent medium layer has a thickness not less than 15 micrometers.

7. A vehicle lamp, comprising the lighting module for three-dimensional suspension imaging according to claim 1, wherein the image thin film is provided on an inner surface, an outer surface, or an interior of a decorative ring or a decorative strip, or provided on an inner surface, an outer surface, or an interior of a light distribution lens, or provided on a transparent bearing member in the vehicle lamp, and the microlens array is provided toward the light distribution lens.

8. A vehicle lamp, comprising the lighting module for three-dimensional suspension imaging according to claim 1.

* * * * *